(12) United States Patent
Martin

(10) Patent No.: US 7,945,779 B2
(45) Date of Patent: May 17, 2011

(54) SECURING A COMMUNICATIONS EXCHANGE BETWEEN COMPUTERS

(75) Inventor: Cameron Kenneth Martin, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 11/764,434

(22) Filed: Jun. 18, 2007

(65) Prior Publication Data

US 2008/0065880 A1    Mar. 13, 2008

(30) Foreign Application Priority Data

Jun. 28, 2006    (GB) .................................. 0612775.7

(51) Int. Cl.
*H04L 9/32*     (2006.01)
*H04L 29/06*    (2006.01)
*G06F 7/04*     (2006.01)
*G06F 15/16*    (2006.01)
*G06F 17/30*    (2006.01)
*H04L 9/00*     (2006.01)
*H04L 9/38*     (2006.01)
*H04L 9/08*     (2006.01)
*H04K 1/00*     (2006.01)

(52) U.S. Cl. ............ 713/170; 713/156; 713/181; 726/5; 726/7; 726/12; 380/2; 380/28; 380/286

(58) Field of Classification Search ........................ None
See application file for complete search history.

(56) References Cited

U.S. PATENT DOCUMENTS

| | | | |
|---|---|---|---|
| 2003/0016819 A1 * | 1/2003 | Cheng ............................... 380/2 |
| 2004/0177249 A1 * | 9/2004 | Keohane et al. ............... 713/156 |
| 2005/0157881 A1 * | 7/2005 | Van Someren ................. 380/286 |
| 2005/0177867 A1 * | 8/2005 | Toutonghi .......................... 726/7 |
| 2006/0037066 A1 * | 2/2006 | Audebert ........................... 726/5 |
| 2006/0050869 A1 * | 3/2006 | Tuvell et al. .................... 380/28 |
| 2006/0101510 A1 * | 5/2006 | Kadyk et al. .................... 726/12 |
| 2009/0254756 A1 * | 10/2009 | Kawakita ...................... 713/181 |

* cited by examiner

*Primary Examiner* — Shin-Hon Chen
(74) *Attorney, Agent, or Firm* — A. Bruce Clay

(57) ABSTRACT

For use in a distributed system where a client computer is operable to communicate with a server computer and to receive a digital certificate associated with a remote external component, apparatus for securing a communications exchange between computers includes a hasher, responsive to the client computer receiving a digital certificate, for hashing data associated with the client computer and the server computer with data associated with the digital certificate to create a first message digest, and a first transmitter for transmitting the first message digest to the remote external component.

20 Claims, 8 Drawing Sheets

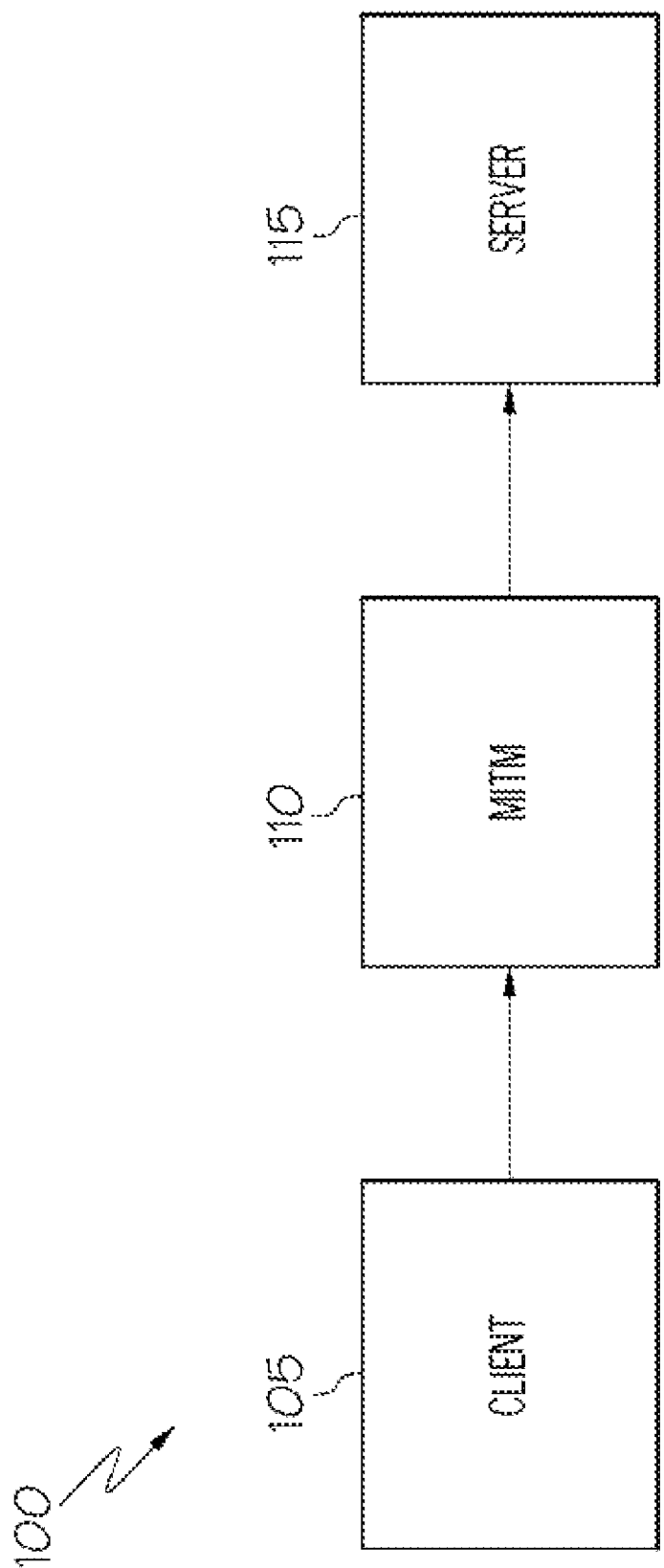

SECURING A COMMUNICATIONS EXCHANGE BETWEEN COMPUTERS

FIELD OF THE INVENTION

CROSS-REFERENCE TO RELATED APPLICATIONS

This application claims foreign priority benefits under 35 U.S.C. §110 to co-pending UK patent application number 0612775.7, filed Jun. 28, 2006, and is incorporated herein by reference.

BACKGROUND OF THE INVENTION

The Internet is popular as a medium for electronic transactions, for example, transactions between a customer's client computer and a vendor's server computer. With reference to a system (100) shown in FIG. 1, a client computer (105) can establish a network connection with a server computer (115). Once the network connection has been established, the client computer (105) and the server computer (115) can begin to exchange data.

However, network communications are susceptible to security attacks. One type of security attack is known as a man-in-the-middle (MITM) attack. In a MITM attack, a MITM (110) can intercept, relay, view and/or modify data between the client computer (105) and the server computer (115). This type of attack is often invisible to the client computer (105) and the server computer (115), who believe that they are communicating with each other, oblivious to the fact the MITM (110) has compromised their communications.

There is thus a need to improve defenses against a MITM attack.

SUMMARY

According to a first aspect, the present invention provides an apparatus for securing a communications exchange between computers, for use in a distributed system wherein a client computer is operable to communicate with a server computer and to receive a digital certificate associated with a remote external component, the apparatus comprising: a hasher, responsive to the client computer receiving a digital certificate, for hashing data associated with the client computer and the server computer with data associated with the digital certificate to create a first message digest; and a first transmitter for transmitting the first message digest to the remote external component.

Preferably, the apparatus resides on at least one of: the client computer and the server computer.

Preferably, the apparatus further comprises a first receiver for receiving the first message digest. More preferably, the apparatus further comprises an encryptor for encrypting the first message digest prior to transmission of the first message digest. Still more preferably, the apparatus further comprises a decryptor, responsive to receipt of the first message digest, for decrypting the first message digest.

In a preferred embodiment, the data associated with the digital certificate comprises a fingerprint of the digital certificate. Preferably, wherein the remote external component is the server computer and the digital certificate is associated with the server computer. More preferably, the remote external component is the server computer, the apparatus further comprising: a comparator, responsive to the first receiver receiving the first message digest, for comparing the first message digest with a second message digest in order to determine whether the first message digest matches the second message digest.

Preferably, the remote external component is the server computer and the apparatus further comprises a nonce generator for generating a nonce value. More preferably, the apparatus further comprises a second transmitter for transmitting the nonce value to a second receiver. Still more preferably, in response to receipt of the nonce value, the hasher hashes data associated with the client computer and a server computer with data associated with the digital certificate and the nonce value.

In a preferred embodiment, the apparatus further comprises an alert generator for generating an alert. Preferably, the alert generator is responsive to a time period expiring.

According to a second aspect, the present invention provides a method for securing a communications exchange between computers, for use in a distributed system wherein a client computer is operable to communicate with a server computer and to receive a digital certificate associated with a remote external component, the method comprising the steps of: hashing, in response to the client computer receiving a digital certificate, data associated with the client computer and the server computer with data associated with the digital certificate to create a first message digest; and transmitting the first message digest to the remote external component.

According to a third aspect, the present invention provides a computer program comprising program code means adapted to perform all the steps of the method above when said program is run on a computer.

BRIEF DESCRIPTION OF THE DRAWINGS

The present invention will now be described, by way of example only, with reference to preferred embodiments thereof, as illustrated in the following drawings, wherein:

FIG. 1 is a block diagram of a system in which a MITM attack has occurred;

DETAILED DESCRIPTION

The examples herein are described with reference to Secure Sockets Layer (SSL) protocol. However, it should be understood by a skilled person, that a number of other public/private key-based security protocols can be used e.g. Secure Shell (SSH) protocol.

Along with the increase in the level of activities on the Internet, the need to exchange sensitive data over secured channels becomes important as well.

Secure Sockets Layer (SSL) protocol is a de facto standard from Netscape Communications Corporation for establishing a secure channel for communication over the Internet, whereby data can be sent securely utilizing that channel, between a server computer and a client computer. A subsequent enhancement to SSL known as Transport Layer Security (TLS) is also commonly used. TLS operates in a similar manner to SSL and the two protocols will be referred to herein as "SSL".

The SSL protocol comprises two sub-protocols, namely, the SSL, Handshake protocol and the SSL Record protocol.

The SSL Handshake protocol utilizes the SSL Record protocol to allow a server computer and client computer to authenticate each other and negotiate an encryption algorithm and cryptographic keys before any data is communicated.

The client computer and the server computer can exchange several further messages in the handshaking process. Once handshaking has been completed, an SSL connection is established that is encrypted using the negotiated keys etc.

The client computer and the server computer can now exchange application level data using the SSL Record Protocol over the SSL connection. The SSL, Record protocol is layered on top of some reliable transport protocol, such as the Transmission Control Protocol (TCP) and defines the format for data transmission. In operation, an HTTP request is sent across the encrypted SSL connection to the server computer. An HTTP response is sent across the encrypted SSL connection from the server computer to the client computer. The use of HTTP over an SSL connection is known as HTTPS.

Figure 2A:
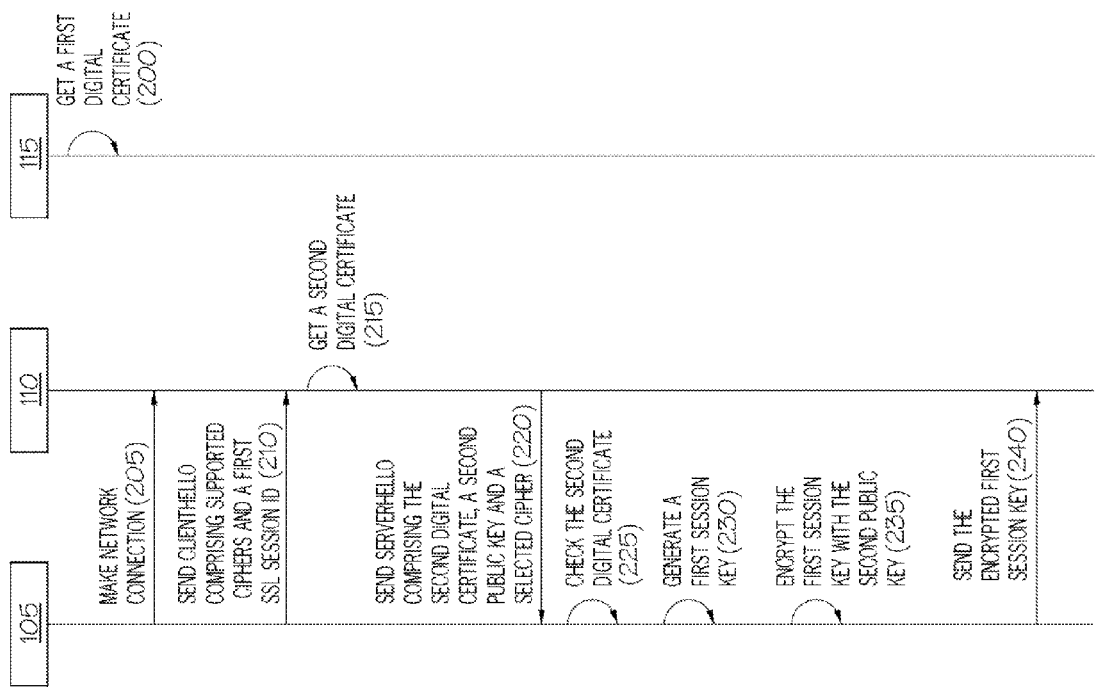
FIGS. 2A-2B, collectively called FIG. 2 below, constitute a flow chart showing the operational steps performed in one type of prior art MITM attack.
Figure 2B:
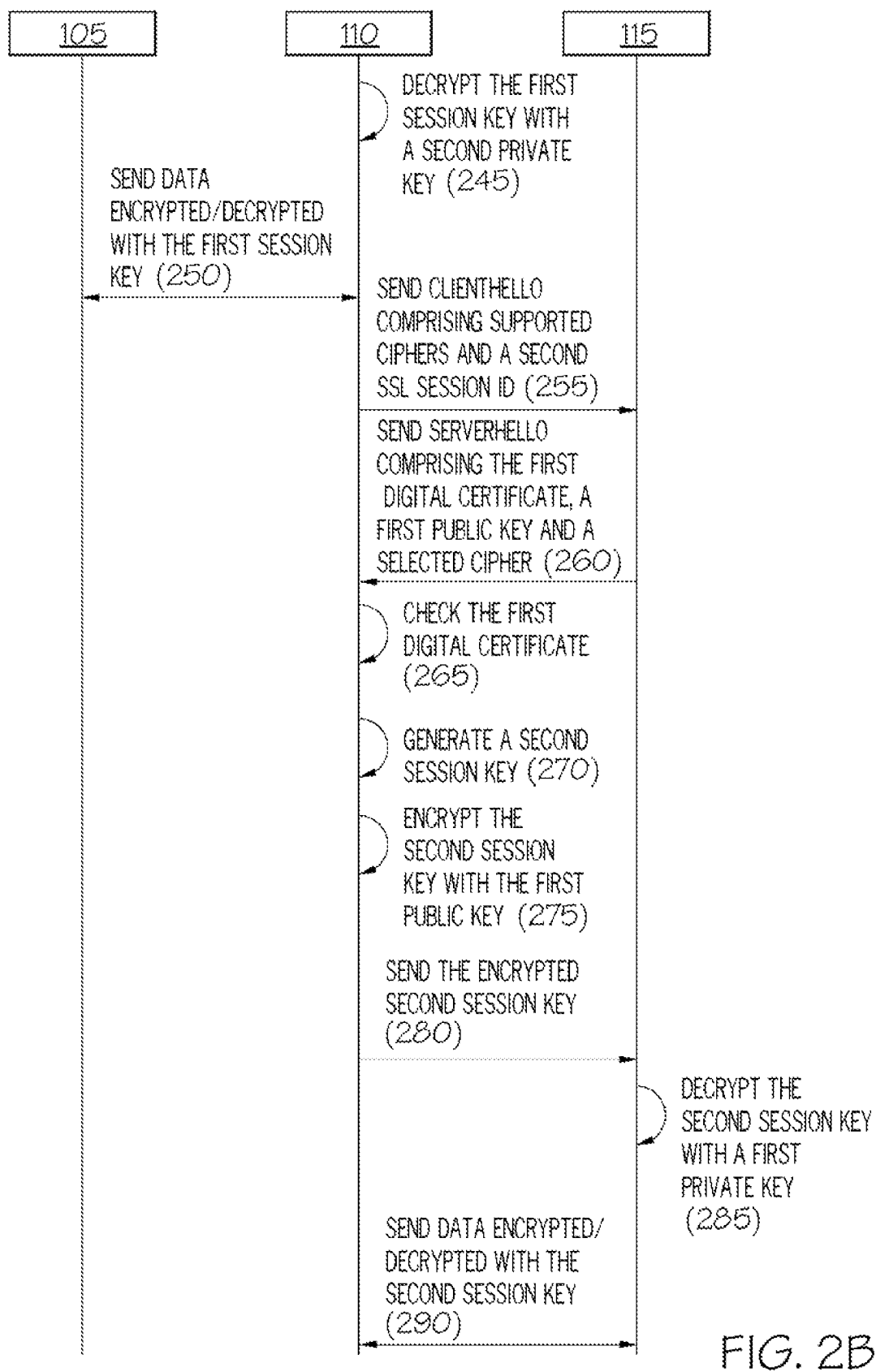

However, even secured channels are susceptible to security attacks. A prior art flow will be described with reference to FIG. 2, wherein in a first example, communications between the client computer (105) and the server computer (115) are compromised by a MITM (110).

At step 200, the server computer (115) obtains a first digital certificate and is available to accept network connections.

It should be understood that digital certificates can be used with SSL for authentication. A digital certificate is a form of personal identification that can be verified electronically. It is used as a form of identification for individual persons and other entities, such as servers. Digital certificates are issued by a Certificate Authority (CA). CAs are entities that are entrusted to properly issue digital certificates. However, a digital certificate issued by a well-known CA is typically trusted more than a digital certificate issued by an unknown CA.

A digital certificate typically comprises the following fields:
   a name associated with an entity that the digital certificate was created for;
   a name associated with the CA that issued the digital certificate;
   a digital signature from the CA that issued the digital certificate;
   the entity's public key; and
   Validity: Not Before and Validity: Not After fields representing a time period for which the digital certificate is valid.

The client computer (105) wishes to establish a network connection to the server computer (115) which is specified by a domain name. Typically, the client computer (105) sends a DNS (Domain Name Service) request comprising a domain name of a server computer (115) targeted to its Domain Name Service (DNS) server. The DNS server maps the domain name to a network address associated with the server computer (115) and sends the network address to the client computer (105). The client computer (105) uses the network address to make a network connection to the server computer (115).

However, a MITM (110) can compromise a DNS server. In the first example, when the client computer (105) sends a DNS request comprising the domain name of the server computer (115) to its DNS server, since the MITM (110) has compromised this DNS server, rather than the DNS server sending the server computer's (115) network address to the client computer (105), the DNS server sends the network address of the MITM server (110) to the client computer (105). The client computer (105) uses the supplied network address to make (step 205) a network connection, which is, unknown to the client computer (105), to the MITM (110).

At step 210, the client computer (105) initiates a handshake by sending a ClientHello message to request a secured connection (which the client computer (105) believes is targeted to the server computer (115)). However, instead, the client computer's (105) ClientHello message is sent to the MITM (110). The ClientHello message comprises attributes such as a first SSL Session ID associated with an SSL connection and identifiers of ciphers or types of encryption keys supported by the client computer (105).

In response to receiving the request, the MITM (110) obtains (step 215) a second digital certificate.

The MITM (110) completes the field associated with a name associated with an entity in the second digital certificate. Typically, the MITM (110) inserts a name such as "default" or a well known name in the field. Typically, the MITM creates a static mapping between one name associated with an entity and one particular MITM network address or a static mapping between one name associated with an entity and one particular client computer network address.

After obtaining the second digital certificate, the MITM (110) sends (step 220) a ServerHello message to the client computer (105), wherein the ServerHello message comprises the second digital certificate, the MITM's (110) public key (i.e. a second public key) and a cipher that is supported by the client computer (105) and selected by the MITM (110).

At step 225, the client computer (105) checks the received second digital certificate.

For example, the client computer (105) verifies that the entry in the name associated with an entity field matches a domain name in a HTTP request to be sent via an established SSL connection by the client computer (105).

The client computer (105) also checks a name associated with the CA and the validity of the digital signature in order to determine whether the second digital certificate is comprised in a list having data associated with trusted certificates and/or whether the second digital certificate is issued by a CA comprised in a list having data associated with trusted CAs (i.e. wherein the list is maintained by the client computer (105)).

The client computer (105) also checks the Validity: Not Before and Validity: Not After fields in order to verify that the second digital certificate is within its time period of validity.

If any of these cheeks fails, the client computer (105) can cancel establishment of the secured connection. Alternatively, the client computer (105) can prompt the user to accept a certificate that has been presented and to proceed with establishing a secured connection. It is assumed that a user will inspect the contents of a certificate before accepting the certificate.

A feature to aid a user can be provided by way of a list of trusted certificates and/or certificate authorities. Before accepting a certificate, a user can check the certificate against the list in order to ensure that a secure connection is only established with the server computer (115) rather than the MITM (110).

It should be understood that, a user may not complete the checks on a certificate correctly, may accept, the certificate without checking against a list or may not have an associated list available. For example, a value in the field of a name associated with an entity can be different from a name associated with the server computer (115). In one example, if the certificate is associated with the server computer (115), a reason for the difference can be that the server computer's (115) domain name has been changed without update of the certificate. If a user does not pick this difference up and if this certificate is accepted by the user of the client computer (105), then a secured connection with the server computer (115) will still be established successfully. In this example, a user is not at risk, as a secured connection has been established with the server computer (115).

In the first example however, the second digital certificate that the user receives is associated with a MITM (110) and the user accepts the second digital certificate. At step 230, the client computer (105) uses the selected cipher to generate a first session key (i.e. an encryption key to be used only for the current session). The client computer (105) encrypts (step 235) the first session key with the second public key and sends (step 240) the encrypted first session key to the MITM (110). In response to receiving the encrypted first session key, the MITM (110) decrypts (step 245) the first session key with a second private key.

In response to the decrypting step, the handshake is now complete and the client, computer (105) and the MITM (110) can begin to exchange (step 250) application level data (e.g. HTTPS requests/responses) that is encrypted and decrypted using the first session key. That is, a first secured session is established between the client computer (105) and the MITM (110).

It should be understood that at this stage, the MITM (110) can use a domain name of the server computer (115) comprised in a HTTPS request from the client computer (105) and send the domain name in a DNS request to a non-compromised DNS server. The non-compromised DNS sewer sends a response to the MITM (110) comprising a network; address of the server computer (115).

At step 255, the MITM (110) uses the network address associated with the server computer (115) to initiate a handshake to request a secured connection to the server computer (115). The MITM (110) sends a ClientHello message to the server computer (115). The ClientHello message comprises attributes such as a second SSL Session ID associated with an SSL connection and ciphers or types of encryption keys supported by the MITM (110).

In response to receiving the request, the server computer (115) sends (step 260) a ServerHello message to the MITM (110), wherein the ServerHello message comprises the first digital certificate, the server computer's (115) public key (i.e. a first public key) and a cipher that is supported by the MITM (110) and selected by the server computer (115).

At step 265, the MITM (110) optionally checks the received first digital certificate. However, it should be understood that this step is optional as the MITM (110) is typically not concerned with checking a digital certificate associated with the server computer (115).

It should be understood that in a subsequent flow or prior to the MITM (110) obtaining a second digital certificate (i.e. prior to step 215), the MITM (110) can inspect the first digital certificate in order to complete portions of the second digital certificate (e.g. the field comprising a name associated with an entity).

In the first example, the MITM accepts the first digital certificate.

At step 270, the MITM (110) uses the selected cipher to generate a second session key (i.e. an encryption key to be used only for the current session). The MITM: (110) encrypts (step 275) the second session key with the first public key and sends (step 280) the encrypted second session key to the server computer (115). In response to receiving the encrypted second session key, the server computer (115) decrypts (step 285) the second session key with a first private key.

In response to the decrypting step, the handshake is now complete and the MITM (110) and the server computer (115) can begin to exchange (step 290) application level data that is encrypted and decrypted using the second session key. That is, a second secured session is established between the MITM (110) and the server computer (115).

It should be understood that the MITM (110) can now intercept and relay data communicated by the client computer (105) and the server computer (115). For example, a password is sent by the client computer (105) to the MITM (110), wherein the password is part of an SSL Record that contains application data encrypted using the first session key. In response to receiving the encrypted SSL Record, the MITM (110) decrypts the SSL Record using the first session key to obtain the password. In order to relay the password, the MITM (110) creates an SSL Record comprising the password which is encrypted using the second session key and sends the SSL record to the server computer (115). The server computer (115) decrypts the SSL Record using the second session key to obtain the password.

The prior art flow is disadvantageous because the MITM (110) can now intercept all data flowing between the client computer (105) and the server computer (115). For example, by obtaining the password, the MITM (110) can impersonate the client computer (105).

In the above description, a MITM attack has been described wherein the MITM compromises a DNS server. However, a number of other MITM attacks exist. In one example, a MITM compromises a client computer's host file such that a given server computer's domain name is mapped to a MITM's network address. In another example, a MITM performs IP address spoofing on a routed network, such that requests destined for a particular IP address, such as a subnet gateway, are directed to an alternate server. In yet another example, a MITM can perform ARP spoofing, so that requests destined for a particular MAC address, such as a subnet gateway, are directed to an alternate server.

It should be understood that there are prior art methods that attempt to solve the problems associated with MITM attacks.

In one prior art method, a message digest comprising a hash of a user's password is created and sent over the network, wherein a nonce value is also typically used. It should be understood that, message digest authentication is still vulnerable to a MITM attack. Although the MITM will not be able to gain access to a clear text password (i.e. since a message digest of the password together with a nonce is sent), the MITM will be able to proxy the message digest to a server computer. The server computer uses the message digest (e.g. by comparing the message digest against a server computer calculated message digest) to authenticate the user. If the authentication is successful, the client computer and the server computer can begin to exchange data. However, this data can then be intercepted by the MITM. Thus a MITM can intercept, relay, view and/or modify subsequent requests/responses between the client computer and the server computer.

Although a nonce value aids against future replay attacks, the nonce value does not provide a complete solution, since by proxying the message digest to the server computer, for the current session, the MITM has compromised data flows.

In the case wherein message digest authentication is combined with HTTPS and a client computer incorrectly accepts a MITM certificate rather than a server computer certificate, then the MITM will be able to intercept, relay, view and/or modify all requests/responses between a client computer and a server computer, with the exception of the password itself.

Another method described in the prior art (US 2005/0022020 A1) performs a hash of parameters comprising a password, a network address associated with a client computer, a network address associated with a server computer and an N byte nonce value.

However, if a client computer connects to a MITM which provides the client computer with a spoofed network address associated with a server computer, the client computer creates a hash (i.e. of parameters including the spoofed network address) and sends a resulting message digest to the MITM.

Although the MITM cannot obtain the password in clear text, the MITM can proxy this message digest to the server computer, because the spoofed network address is the same as the server's network address. The server computer uses the message digest (e.g. by comparing the message digest against a server computer calculated message digest) to authenticate the user. If the authentication is successful, the client computer and the server computer can begin to exchange data. However, this data can then be intercepted by the MITM.

As described above, a nonce value provides a partial solution to this type of MITM attack. However, a nonce value only aids against future replay attacks.

Another prior art method prompts users to provide a partial input of their credentials. For example, the user is prompted to provide a first digit and a third digit of a four digit PIN. However, if a client computer connects to a MITM, even though the MITM will not be able to obtain the entire four digit PIN in clear text, the MITM can proxy the partial input to a server computer. The server computer can use the partial input to authenticate the user. If the authentication is successful, the client computer and server computer can begin to exchange data. However, this data can then be intercepted by the MITM.

Figure 3:
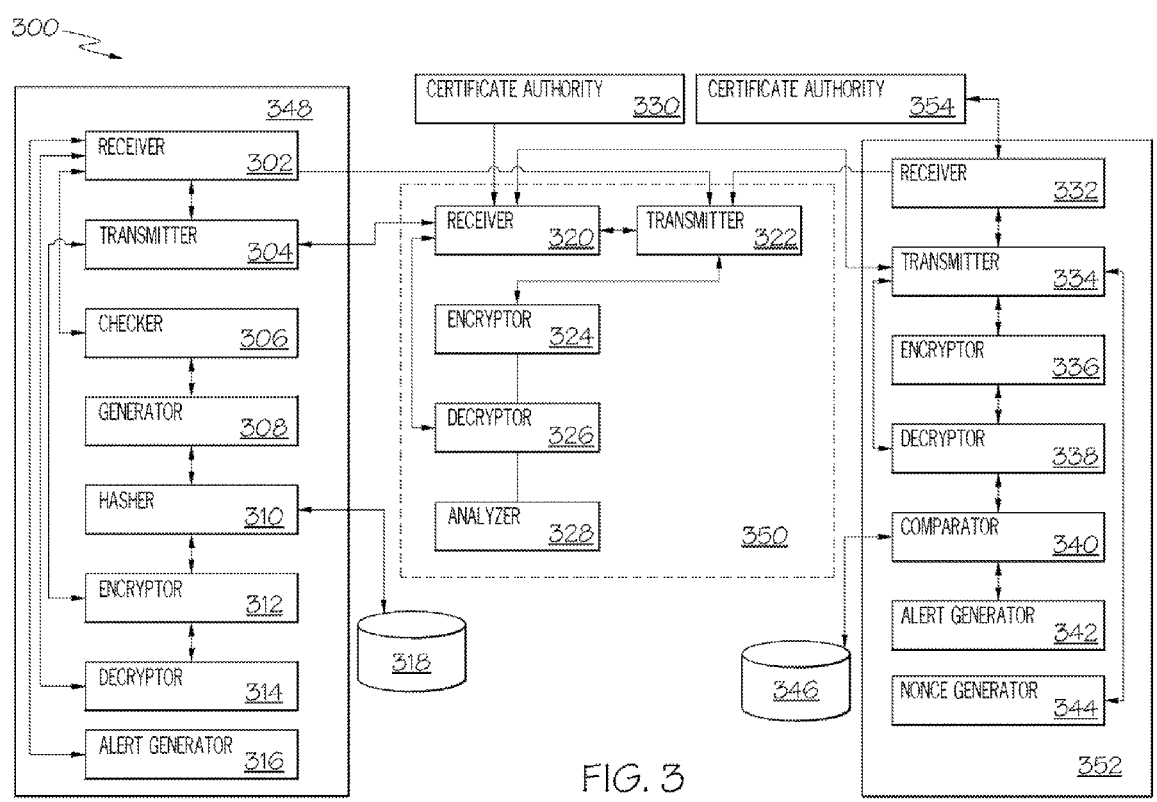
FIG. 3 is a block diagram of a system comprising an apparatus according to a preferred embodiment.

The preferred embodiment will now be described with reference to a system (300) shown in FIG. 3. There is shown a client computer (348) comprising a first receiver (302) for receiving data and a first transmitter (304) for transmitting data, wherein the first transmitter (304) communicates with the first receiver (302). There is also shown a checker (306) for checking data, wherein the checker (306) communicates with the first receiver (302). There is also shown a generator (308) for generating a session key wherein the generator (308) communicates with the checker (306). There is also shown a hasher (310) for hashing data, wherein the hasher (310) has access to a first storage component (318) and communicates with the generator (308), There is also shown a first encryptor (312) for encrypting data, wherein the first encryptor (312) communicates with the first transmitter (304) and the hasher (310). There is also shown a first decryptor (314) for decrypting data, wherein the first decryptor (314) communicates with the first encryptor (312) and the first receiver (302). There is also shown a first alert generator (316) for generating alerts, wherein the first alert generator (316) communicates with the first receiver (302).

The system (300) also comprises a MITM (350) comprising a second receiver (320) for receiving data and a second transmitter (322) for transmitting data, wherein the second transmitter (322) communicates with the second receiver (320). There is shown a second encryptor (324) for encrypting data, wherein the second encryptor (324) communicates with the second transmitter (322). There is also shown a second decryptor (326) for decrypting data, wherein the second decryptor (326) communicates with the second encryptor (324) and the second receiver (320). There is also shown an analyzer (328) for analyzing data, wherein the analyzer (328) communicates with the second decryptor (326).

The system (300) also comprises a server computer (352) comprising a third receiver (332) for receiving data and a third transmitter (334) for transmitting data, wherein the third transmitter (334) communicates with the third receiver (332). There is also shown a third encryptor (336) for encrypting data, wherein the third encryptor (336) communicates with the third transmitter (334). There is also shown a third decryptor (338) for decrypting data, wherein the third decryptor (338) communicates with the third encryptor (336) and the third receiver (332). There is also shown a comparator (340) for comparing data, wherein the comparator (340) has access to a second storage component (346) and communicates with the third decryptor (338). There is also shown a second alert generator (342) for generating alerts, wherein the second alert generator (342) communicates with the comparator (340). There is also shown a nonce generator (344) for generating a nonce, wherein the nonce generator (344) communicates with the third transmitter (334).

The system (300) also comprises a first certificate authority (330) for issuing the MITM (350) with a digital certificate. The first certificate authority (330) communicates with the second receiver (320). In the description herein, the first certificate authority (330) is owned by the MITM. The system (300) also comprises a second certificate authority (354) for issuing the server computer (352) with a digital certificate. The second certificate authority (354) communicates with the third receiver (332). In the description herein, the second certificate authority (354) is owned by a third party.

Figure 4A:
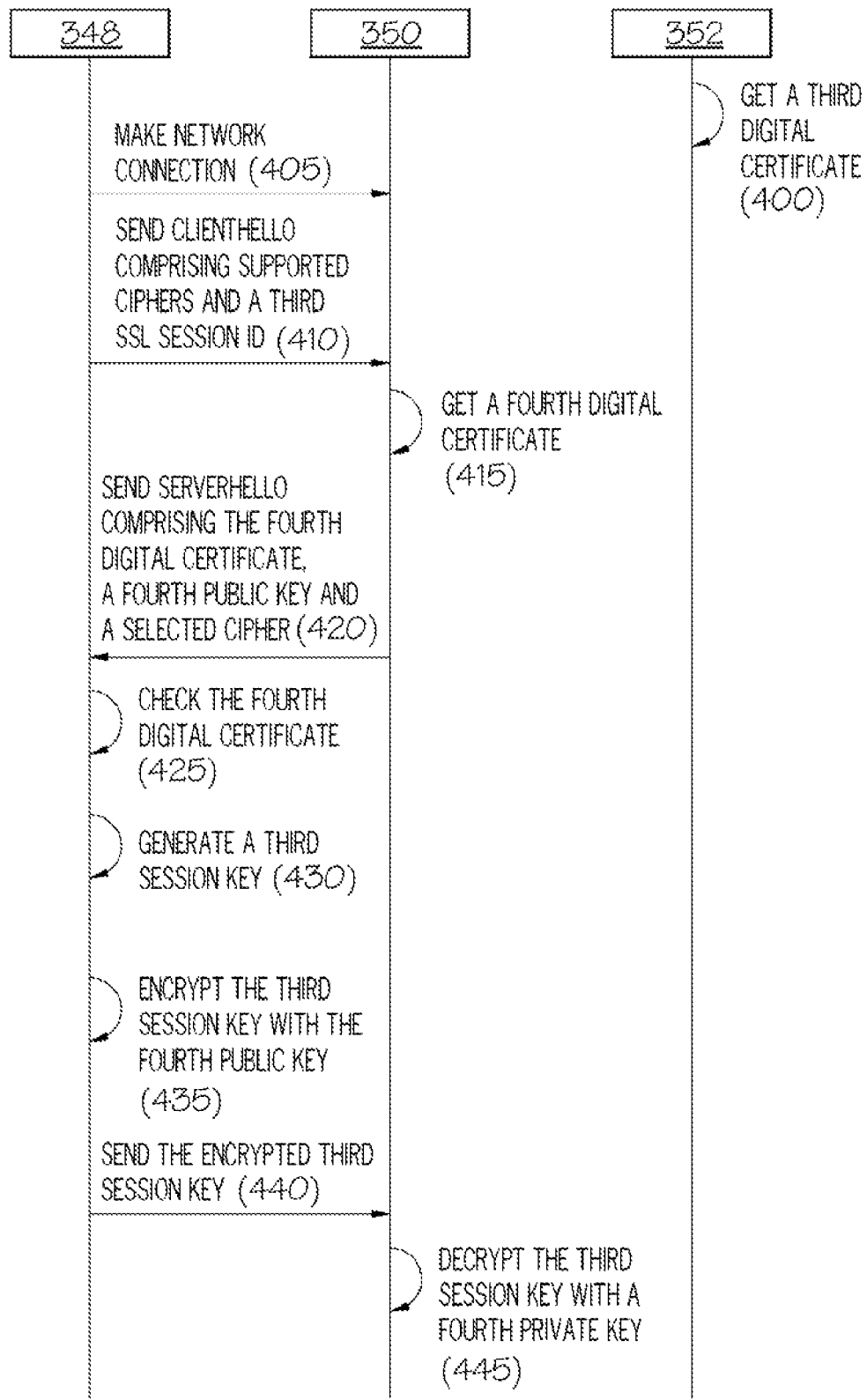
FIGS. 4A-4B, collectively called FIG. 4 below, constitute a flow chart showing the operational steps performed in the preferred embodiment during one type of MITM attack.
Figure 4B:
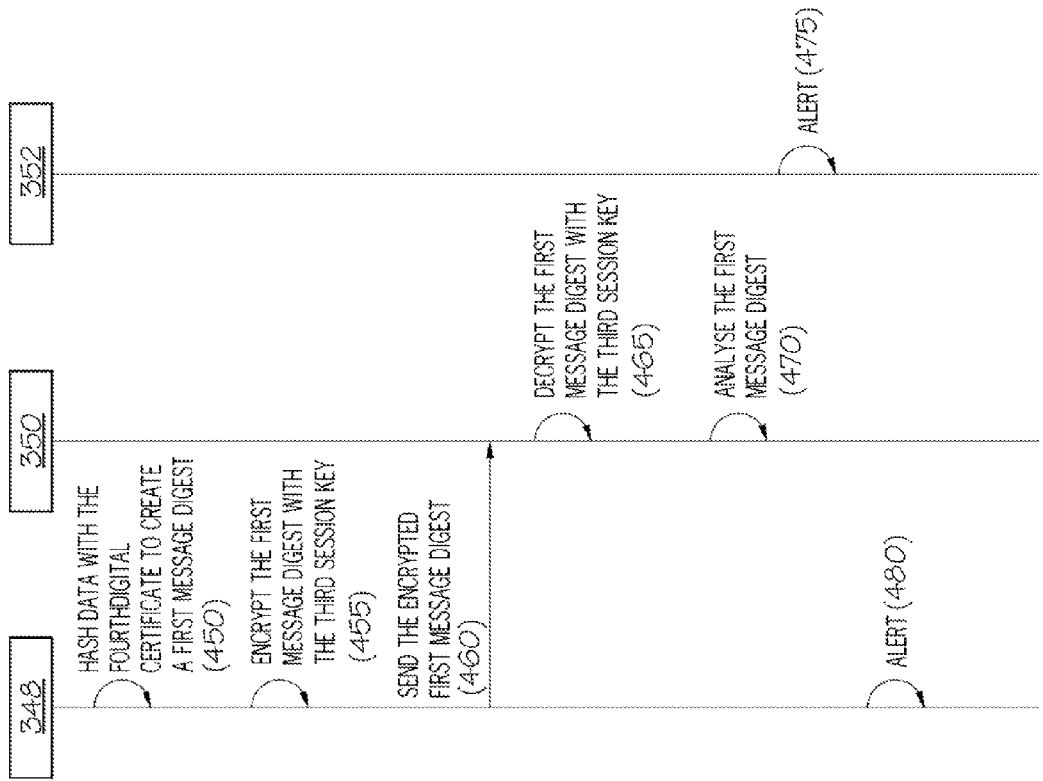

A process according to the preferred embodiment will now be described with reference to FIGS. 3 and 4, wherein in a second example, communications between the client computer (348) and the server computer (352) are compromised by a MITM (350).

At step 400, the third receiver (332) of the server computer (352) obtains a third digital certificate from the second certificate authority (354).

The client computer (348) wishes to establish a network connection to the server computer (352). However, a MITM (350) compromises a DNS server as described above and the client computer (348) uses a MITM network address to make (step 405) a network connection to the MITM (350).

At step 410, the client computer (348) initiates a handshake to request a secured connection (which the client computer (348) believes is targeted to the server computer (352)). However, instead, the client computer (348) sends a ClientHello message to the second receiver (320). The ClientHello message comprises attributes such as a third SSL Session ID associated with an SSL connection and ciphers or types of encryption keys supported by the client computer (348).

In response to receiving the request, the second receiver (320) of the MITM (350) obtains (step 415) a fourth digital certificate from the first certificate authority (330).

After obtaining the fourth digital certificate, the second transmitter (322) sends (step 420) a ServerHello message to the first receiver (302), wherein the ServerHello message comprises the fourth digital certificate, the MITM's (350) public key (i.e. a fourth public key) and a cipher that is supported by the client computer (348) and selected by the MITM (350).

At step 425, the checker (306) checks the received fourth digital certificate.

That is, the checker (306) verifies that the entry in the name associated with an entity field matches a domain name in a HTTP request to be sent via an established SSL connection by the first transmitter (304).

The checker (306) also checks a name associated with the CA and the validity of the digital signature in order to determine whether the fourth digital certificate was issued by a trusted CA.

The checker (306) also checks the Validity Valid From and Validity Valid To fields in order to verify that the fourth digital certificate is within its time period of validity.

If any of these checks falls, the client computer (348) can cancel establishment of the secured connection. Alternatively, the client computer (348) can prompt the user to accept the fourth digital certificate that has been presented and to proceed with establishing a secured connection. (As described above with reference to FIG. 2, in the prior art, if the fourth digital certificate is accepted by the user, then the MITM (350) will be able to compromise data flows between the client computer (348) and the server computer (352)).

In the second example, the user accepts the fourth digital certificate.

At step 430, the generator (308) uses the selected cipher to generate a third session key (i.e. an encryption key to be used only for the current session).

The first encryptor (312) encrypts (step 435) the third session key with the fourth public key and the first transmitter (304) sends (step 440) the encrypted third session key to the second receiver (320). In response to receipt of the encrypted third session key, the second decryptor (326) decrypts (step 445) the third session key with a fourth private key.

In response to the decrypting step, the handshake is now complete and the client computer (348) and the MITM (350) can begin to exchange application level data that is encrypted and decrypted using the third session key That is, a third secured session is established between the client computer (348) and the MITM (350).

According to a preferred embodiment, the hasher (310) hashes (step 450) the user's password (e.g. wherein the password is stored in the first storage component (318)) with the received fourth digital certificate using a hash algorithm to create a first message digest.

It should be understood that typically, a client computer hashes data known to a server computer (e.g. credentials data) using a hash algorithm to create a message digest. In response to receiving the message digest, the server computer uses the message digest to authenticate the user. In one example, the server computer stores the known data in clear text form. In response to receiving a message digest, the server computer hashes the known data using the same hash algorithm that the client computer used in order to generate a further message digest. The server computer compares the message digest with the further message digest and if they match, the server computer authenticates the user and other application data is now permitted to flow.

The first encryptor (312) encrypts (step 455) the first message digest with the third session key and the first transmitter (304) sends (step 460) the encrypted first message digest to the second receiver (320).

In response to receipt of the encrypted first message digest, the second decryptor (326) decrypts (step 465) the first message digest with the third session key.

The analyzer (328) analyses (step 470) the first message digest. The analyzer (328) determines that the password is not in clear text. Thus, advantageously, the MITM (350) cannot obtain the password.

Furthermore, it should be understood that the MITM (350) cannot simply proxy the first message digest to the server computer (352) such that subsequent requests/responses between the client computer (348) and the server computer (352) can be intercepted. That is, the client computer (348) uses the fourth digital certificate to generate the first message digest. When the server computer (352) receives the first message digest, the server computer (352) generates a further message digest that can then be used for comparison purposes. The server computer (352) creates a further message digest by hashing the password and with its digital certificate (i.e. the third digital certificate) using the same hash algorithm that the client computer (348) used. When the server computer (352) compares the first message digest with the further message digest, they will not match since the third digital certificate is different from the fourth digital certificate. Thus, the server computer (352) will not be able to authenticate the user.

Thus, as well as not being able to compromise the password, the MITM (350) cannot compromise any data flows between the client computer (348) and the server computer (352) (i.e. any data which is only made available as a result of authentication). For example, if the server computer (352) comprises an online banking facility, the MITM (350) is unable to display a list of recent transactions associated with a bank account of the user, as the server computer (352) has not authenticated the user.

Furthermore, it should be understood that the MITM (350) cannot generate a message digest used by the server computer (352) (i.e. wherein the message digest is created by hashing the password and the third digital certificate i.e. the certificate associated with the server computer (352)) for comparison purposes, because the MITM (350) cannot obtain the password in clear text.

Furthermore, it should be understood that even if a MITM (350) presents the third digital certificate (i.e. the certificate associated with the server computer (352)) to the client computer (348), the MITM: (350) still cannot compromise data, hi an example, in response to receiving a ClientHello message from the client computer (348), the MITM (350) sends a ServerHello message comprising the third digital certificate, the server computer's (352) public key and a cipher that is supported by the client computer (348) and selected by the MITM (350). The checker (306) checks the received third digital certificate and the generator (308) uses the selected cipher to generate a session key. The first encryptor (312) encrypts the session key with the server computer's (352) public key and the first transmitter (304) sends the encrypted session key to the second receiver (320). In response to receipt of the encrypted session key, the second decryptor (326) cannot decrypt the session key since the MITM (350) does not posses the server computer's (352) private key.

Preferably, if the MITM (350) attempts to connect to the server computer (352) (e.g. by attempting to proxy the first message digest), an alert is generated (475) by the second alert generator (342).

Preferably, an alert is generated (480) by the first alert generator (316) at the client computer (348) after a timeout threshold has expired.

In another embodiment a nonce value is created by the server computer (352). The hash algorithm used by the hasher (310) uses the nonce value in addition to the client computer's (348) password and the fourth digital certificate.

It should be understood that alternatively a subset of the fourth digital certificate presented to the client computer (348) can be used by the client computer (348) in order to generate the first message digest. For example, one or more fingerprints contained in the fourth certificate can be used to generate the first message digest. A fingerprint is a hash of contents of fields in a certificate using MD5, SHA1 and/or another hashing algorithm. That is, a certificate can be uniquely referenced solely by this hash.

Advantageously, even if a user accidentally or inadvertently accepts a certificate that is not associated with the server computer, data sent or received by the server computer cannot be compromised by the MITM. The present invention provides much improved security. Furthermore, the present invention minimizes a need for significant user education and client computer configuration burdens as required in the prior art.

Figure 5A:
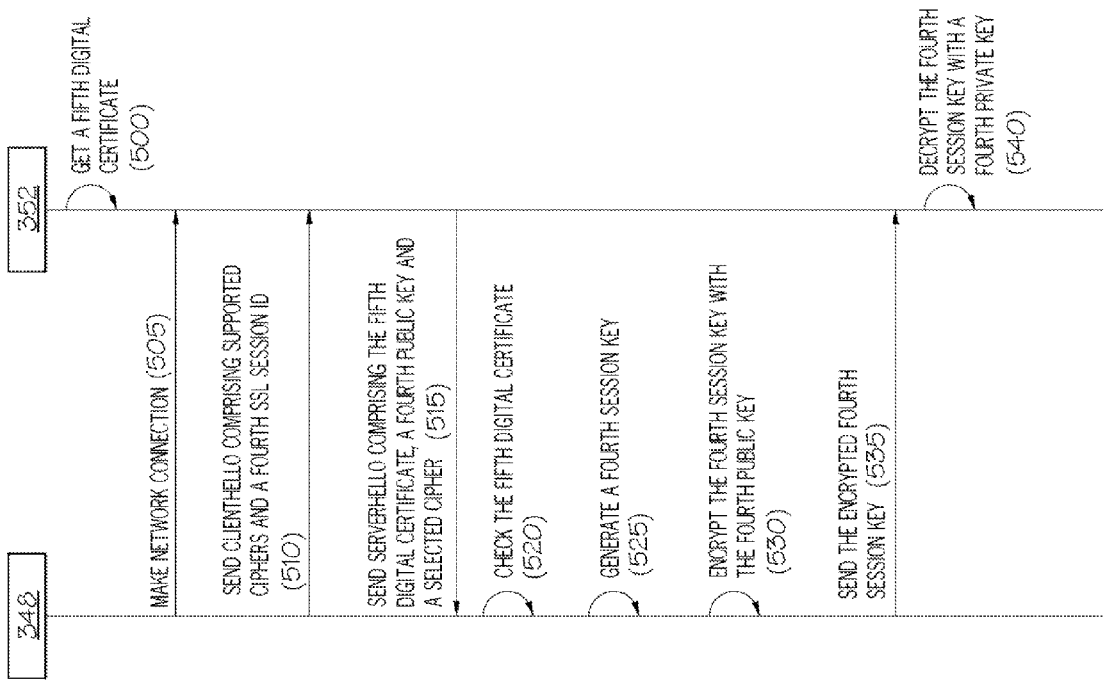
FIGS. 5A-5B, collectively called FIG. 5 below, constitute a flow chart showing the operational steps performed in the preferred embodiment during a secure communications exchange between a client computer and a server computer.
Figure 5B:
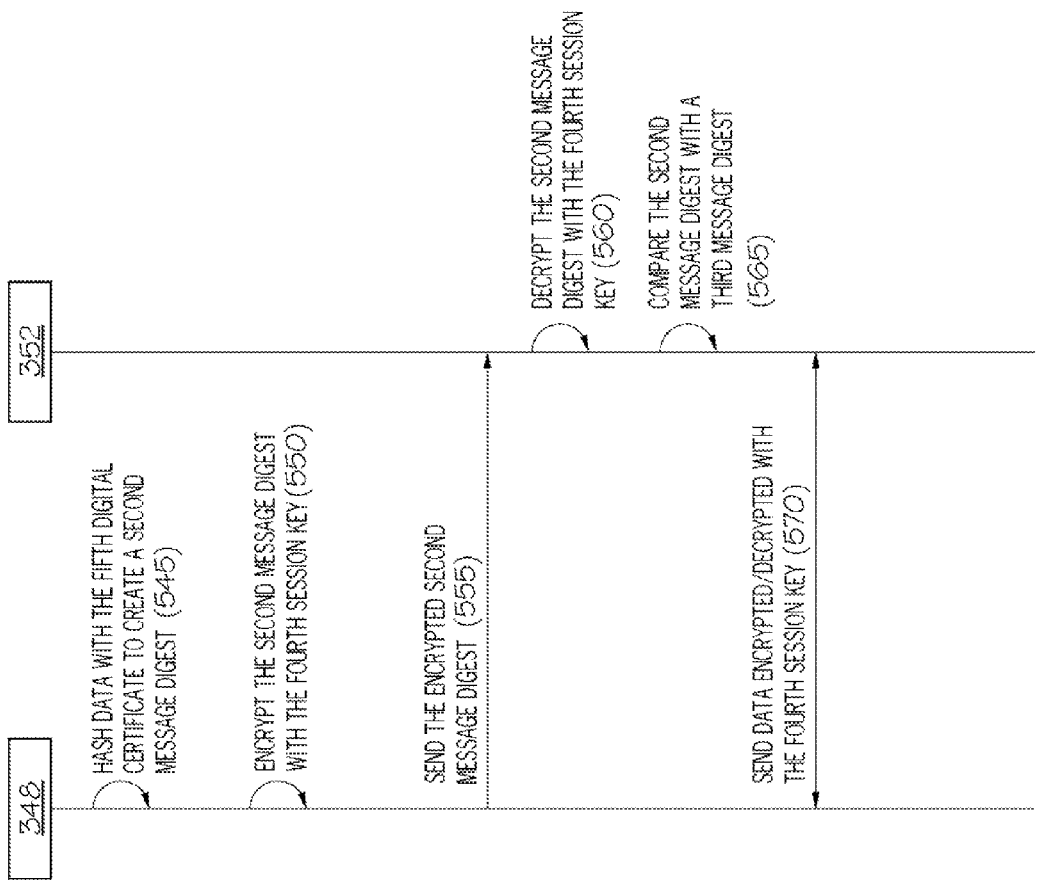

A process according to the preferred embodiment will now be described with reference to FIGS. 3 and 5 wherein in a third example, the client computer (348) successfully makes a network connection to the server computer (352).

At step 500, the third receiver (332) of the server computer (352) obtains a fifth digital certificate from the second certificate authority (354).

The client computer (348) sends a DNS request comprising a domain name of the server computer (352) targeted to a non-compromised DNS server and receives a network address associated with the server computer (352) from the DNS server. The client computer (348) uses the network address to make (step 505) a network connection to the server computer (352).

At step 510, the client computer (348) initiates a handshake to request a secured connection to the server computer (352), wherein the first transmitter (304) sends a ClientHello message to the third receiver (332), The ClientHello message comprises attributes such as a fourth SSL Session ID associated with an SSL connection and ciphers or types of encryption keys supported by the client computer (348).

In response to receipt of the request, the third transmitter (334) sends (step 515) a ServerHello message to the first receiver (302), wherein the ServerHello message comprises the fifth digital certificate, the server computer's (352) public key (i.e. a fourth public key) and a cipher that is supported by the client computer (348) and selected by the server computer (352).

At step 520, the checker (306) checks the received fifth digital certificate as described above.

In the third example, the user accepts the fifth digital certificate.

At step 525, the generator (308) uses the selected cipher to generate a fourth session key (i.e. an encryption key to be used only for the current session).

The first encryptor (312) encrypts (step 530) the fourth session key with the fourth public key and the first transmitter (304) sends (step 535) the encrypted fourth session key to the third receiver (332). In response to receipt of the encrypted fourth session key, the third decryptor (338) decrypts (step 540) the fourth session key with a fourth private key.

In response to the decrypting step, the handshake is now complete and the client computer (348) and the server computer (352) can begin to exchange application level data that is encrypted and decrypted using the fourth session key. That is, a fourth secured session is established between the client computer (348) and the server computer (352).

According to the preferred embodiment, the hasher (310) hashes (step 545) the user's password with the received fifth digital certificate using a hash algorithm to create a second message digest. The first encryptor (312) encrypts (step 550) the second message digest with the fourth session key and the first transmitter (304) sends (step 555) the encrypted second message digest, to the third receiver (332).

In response to receipt of the encrypted second message digest, the third decryptor (338) decrypts (step 560) the second message digest with the fourth session key.

The comparator (340) compares (step 565) the decrypted second message digest with a previously stored third message digest (e.g. wherein the third message digest is stored in the second storage component (346)) comprising a hash of the user's password and the fifth digital certificate.

Alternatively, the server computer (352) uses the user's password previously stored in clear text form (e.g. wherein the password is stored in the second storage component (346)) to create a third message digest by hashing the password and the fifth digital certificate using the same hash algorithm as that used by the hasher (310). The comparator (340) then compares (step 565) the decrypted second message digest with the generated third message digest.

In response to the comparison, if the second and third message digests do not match, the second alert generator (342) generates an alert indicating that there has been a MITM attack, as a change has occurred in the second message digest.

In response to the comparison, if the second and third message digests do match, the client computer (348) and the server computer (352) can begin to exchange (step 570) further application level data that is solely encrypted and decrypted using the fourth session key.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable earner media.

It will be appreciated that the method and arrangement described above may also suitably be carried out fully or partially in software running on one or more processors (not shown in the FIGS.), and that the software may be provided in the form of one or more computer program elements carried on any suitable data-carrier (also not shown in the FIGS.) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave, ft is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. A distributed computer system for securing a communications exchange between computers in the distributed computer system, wherein a client computer is operable to communicate with a server computer and to receive a digital certificate associated with a remote external component, the computer system comprising:
   a processor; and
   a memory connected to the processor, wherein the memory is encoded with instructions and wherein the instructions when executed comprise:
   responsive to the client computer receiving a digital certificate, instructions for hashing a user password and data associated with the digital certificate, using a hash algorithm, to create a first message digest;
   instructions for encrypting said first message digest, said first message digest comprising said hashed user password and said hashed data associated with the digital certificate, with a client computer generated session key;
   instructions for transmitting said encrypted first message digest to the server computer;
   instructions for decrypting said encrypted first message digest into said hashed user password and said hashed data associated with the digital certificate at the server computer;
   instructions for hashing, at said server, a clear text copy of said user password, previously stored at said server, and said data associated with the digital certificate using said hash algorithm to form a second message digest;
   comparing, at said server, said first message digest with said second message digest;
   when it is determined at the server computer that said first message digest and said second message digest are not the same, instructions for denying the communications exchange; and
   when it is determined that said first message digest and said second message digest are the same, instructions for allowing the communications exchange.

2. The distributed computer system of claim 1, wherein the data associated with the digital certificate comprises a fingerprint of the digital certificate.

3. The distributed computer system of claim 1, wherein the remote external component is the server computer and the digital certificate is associated with the server computer.

4. The distributed computer system of claim 1, wherein the remote external component is the server computer, further comprising:
   instructions for generating a nonce value.

5. The distributed computer system of claim 4, further comprising instructions for including said nonce value in said hashing of said user password and said data associated with the digital certificate to create said message digest.

6. The distributed computer system of claim 1, further comprising instructions for generating an alert when said password cannot be decrypted.

7. The distributed computer system of claim 6, further comprising instructions for generating an alert responsive to a time period representing a valid life of the digital certificate has expired.

8. A method for securing a communications exchange between computers in a distributed computer system, wherein a client computer is operable to communicate with a server computer and to receive a digital certificate associated with a remote external component, the method comprising:
   hashing, in response to the client computer receiving a digital certificate, a user password and data associated with the digital certificate, using a hash algorithm, to create a first message digest;
   encrypting said first message digest, said first message digest comprising said hashed user password and said hashed data associated with the digital certificate, with a client computer generated session key;
   transmitting said encrypted first message digest to the server computer;
   decrypting said encrypted first message digest into said hashed user password and said hashed data associated with the digital certificate at the server computer;
   hashing, at said server, a clear text copy of said user password, previously stored at said server, and said data associated with the digital certificate using said hash algorithm to form a second message digest;
   comparing, at said server, said first message digest with said second message digest;
   when it is determined at the server computer that said first message digest and said second message digest are not the same, denying the communications exchange; and
   when it is determined that said first message digest and said second message digest are the same, allowing the communications exchange.

9. The method of claim 8, wherein the data associated with the digital certificate comprises a fingerprint of the digital certificate.

10. The method of claim 8, wherein the remote external component is the server computer and the digital certificate is associated with the server computer.

11. The method of claim 8, wherein the remote external component is the server computer, further comprising:
    generating a nonce value.

12. The method of claim 11, further comprising including said nonce value in said hashing of said user password and said data associated with the digital certificate to create said message digest.

13. The method of claim 8, further comprising generating an alert when said password cannot be decrypted.

14. The method of claim 8, further comprising generating an alert responsive to a time period representing a valid life of the digital certificate has expired.

15. A computer program product for securing a communications exchange between computers in a distributed computer system wherein a client computer is operable to communicate with a server computer and to receive a digital certificate associated with a remote external component, the computer program product comprising a non-transitory computer readable storage medium having computer readable program code tangibly embedded therewith, the computer readable program code comprising:

computer readable program code configured to hash, in response to the client computer receiving a digital certificate, a user password and data associated with the digital certificate, using a hash algorithm, to create a first message digest;

computer readable program code configured to encrypt said first message digest comprising said hashed user password and said hashed data associated with the digital certificate, with a client computer generated session key;

computer readable program code configured to transmit said encrypted first message digest to the server computer;

computer readable program code configured to decrypt said encrypted first message digest into said hashed user password and said hashed data associated with the digital certificate at the server computer;

computer readable program code configured to hash, at said server, a clear text copy of said user password, previously stored at said server, and said data associated with the digital certificate using said hash algorithm to form a second message digest;

computer readable program code configured to compare, at said server, said first message digest with said second message digest;

when it is determined at the server computer that said first message digest and said second message digest are not the same, computer readable program code configured to deny the communications exchange; and when it is determined that said first message digest and said second message digest are the same, computer readable program code configured to allow the communications exchange.

16. The computer program product of claim 15, wherein the data associated with the digital certificate comprises a fingerprint of the digital certificate.

17. The computer program product of claim 15, wherein the remote external component is the server computer and the digital certificate is associated with the server computer.

18. The computer program product of claim 15, wherein the remote external component is the server computer, and further comprising:

computer readable program code configured to generate a nonce value.

19. The computer program product of claim 18, further comprising computer readable program code configured to include said nonce value in said hashing of said user password and said data associated with the digital certificate to create said message digest.

20. The computer program product of claim 15, further comprising computer readable program code configured to generate an alert when said password cannot be decrypted.

\* \* \* \* \*